350-166

SEARCH ROOM

Jan. 21, 1969 A. J. THELEN 3,423,147

MULTILAYER FILTER WITH WIDE TRANSMITTANCE BAND

Filed Oct. 14, 1963

INVENTOR.

Alfred J. Thelen

BY

Flehr and Swain

Attorneys

3,423,147
MULTILAYER FILTER WITH WIDE TRANSMITTANCE BAND

Alfred J. Thelen, Santa Rosa, Calif., assignor to Optical Coating Laboratory Inc., Santa Rosa, Calif., a corporation of California Filed Oct. 14, 1963, Ser. No. 316,099
U.S. Cl. 350—166 6 Claims
Int. Cl. G02b *5/28*

ABSTRACT OF THE DISCLOSURE

Filter having wide transmittance band with layers formed of three different materials and which has a thicker central layer making it possible to suppress second, third and fourth order low transmittance bands or reflectance bands.

This invention relates to a multilayer filter with a wide transmittance band, and more particularly to a multilayer filter with a wide transmittance band having a 5:1 ratio, for the peak wavelengths of two adjacent reflectance bands.

In copending application Ser. No. 110,781, filed May 17, 1961, now United States Letters Patent No. 3,247,392, there is disclosed an optical coating and assembly which serves as a multilayer filter with a wide transmittance band in which it is possible to obtain a ratio of 4:1 for the peak wavelengths of two adjacent reflectance bands and in which two successive low transmittance bands are suppressed. Although this filter has been found to be very satisfactory, there are certain applications in which the materials available do not fit the formula required to make the 4:1 filter. There are also applications in which it is desired to obtain a wider transmittance band than can be obtained with the 4:1 filter. There is, therefore, a need for a new and improved multilayer filter which has a wider transmittance band.

In general, it is an object of the present invention to provide a multilayer with a wide transmittance band which meets the above mentioned objectives.

Another object of the invention is to provide a multilayer filter with a wide transmittance band which has a ratio of 5:1 for the peak wavelengths of two adjacent reflectance bands.

Another object of the invention is to provide a multilayer filter of the above character which utilizes three different coating materials.

Another object of the invention is to provide a multilayer filter of the above character in which the materials are arranged into layers having a predetermined periodicity.

Another object of the invention is to provide a multilayer filter of the above character which is particularly useful as a heat reflector.

Another object of the invention is to provide a multilayer filter of the above character which can be readily combined with other coatings for special applications.

Another object of the invention is to provide a multilayer filter of the above character in which three successive low transmittance bands are suppressed.

Additional objects and features of the invention will appear from the following description in which the preferred embodiments are set forth in detail in conjunction with the accompanying drawings.

Referring to the drawings.

In general, my multilayer filter with a wide transmittance band consists of a plurality of layers formed of three different materials A, B and C to provide a structure which has a periodicity of A, B, 2C, B, A. Each of the layers has an optical thickness of one-twelfth of the design wavelength. This combination of layers and materials makes it possible to suppress the second, third and fourth order low transmittance bands or reflectance bands. It is for this reason that this multilayer has a very wide transmittance band which reflects substantially all the energy outside the transmittance band.

Figure 1:
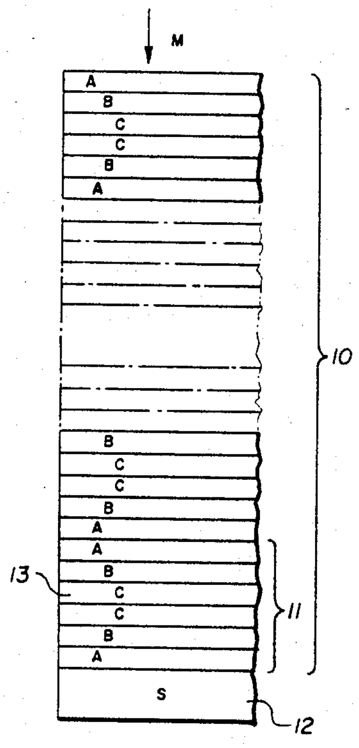
FIGURE 1 is greatly enlarged cross-sectional view of a transparent substrate provided with a multilayer coating with a wide transmittance band in accordance with the present invention.

More in particular, as shown in FIGURE 1, my multilayer filter consists of a coating or stock which is generally designated as 10 which is deposited on a suitable transparent port or substrate 12. The coating 10 consists of a plurality of nonmetallic superimposed interference layers 13 having negligible absorption and having different refractive indices which are deposited one upon the other on one of the surfaces of the substrate 12. Three different materials identified as A, B and C are utilized for the different layers and are arranged in periods 11 with a periodicity of A, B, C, C, B, A, which alternatively may be stated as AB2CBA, as shown particulary in FIGURE 1.

Each of the layers has an optical thickness of one-twelfth wavelength, with the optical thickness being defined as the physical thickness multiplied by the index of refraction of the material. Each filter has a design wavelength and, therefore, the optical thickness is specified as a fraction of this design wavelength. The design wavelength is the wavelength of the first reflectance peak counting from the longer wavelength regional (i.e., the infrared) down. In my multilayer filter, layers having an optical thickness of one-twelfth wavelength are used. However, it should be noted that in each period 11 there are two layers C which abut each other to in effect provide a layer which has a thickness of one-sixth wavelength. The same is true where two periods 11 join, in which case there are two layers A which abut each other to provide a layer which in effect has an optical thickness of one-sixth wavelength.

Any desired number of periods or multilayers 11 can be deposited upon the substrate 12 depending upon the quality of filter desired. A minimum, of course, is one period with six layers. However, in reality, there are only five separate layers because the two layers C are actually one layer having a thickness of one-sixth wavelength. If more than one period is utilized, the actual layers are reduced because the last layer of the period and the first layer of the period are the same so that this can be formed as one layer of one-sixth wavelength in thickness.

Expressed in another way, to suppress three successive low transmittance bands to obtain wide transmittance or, in other words, to suppress the second, third and fourth order low transmittance bands there is deposited upon the substrate 12 a plurality of layers 13 which form a periodic multilayer 11 with *m* periods AB2CBA AB2CBA AB2CBA AB2CBA (*m* times) in which each period is comprised of a group of nonabsorbing thin films which can be called elements or layers 13. Each element 13 is described by its index of refraction $n$ ($n_A$, $n_B$, and $n_c$) and its optical thickness in $x$ ($n_A x_A$, $n_B x_B$, and $n_c x_c$ where $x$ is the physical thickness). The letter S stands for the substrate 12 of the filter and the letter M stands for the surrounding medium which often can be air. The optical thickness of the layers of elements 13 is given by the following equation $$n_A x_A = \lambda_0/12$$

where $\lambda_0$=the design wavelength as defined above.

It is well established that a periodic multilayer has low transmittance bands at the design wavelength $\lambda_0$, at $\lambda_0/2$, at $\lambda_0/3$, and all higher orders except those orders where the transmittance through a period is unity. The $\lambda_0/2$ low transmittance band is commonly called the second order transmittance band, whereas the $\lambda_0/3$ is normally called the third order low transmittance band, etc.

The indices or refraction for the three materials A, B and C must have a relationship as defined by the following equation $$n_B = \sqrt{n_A n_C}$$

Figure 2:
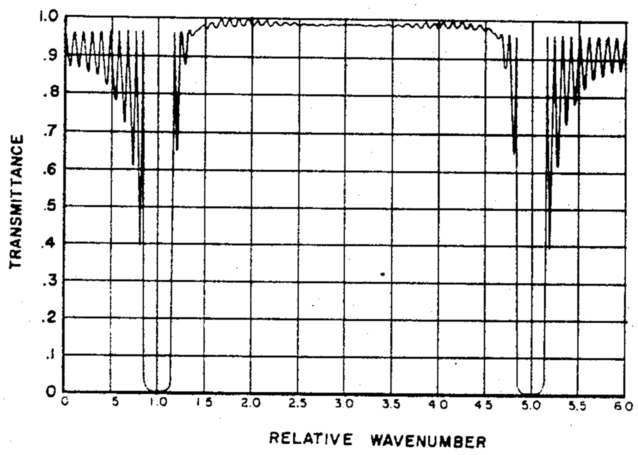
FIGURE 2 is a graph showing the transmittance of the filter as shown in FIGURE 1 as a function of the relative wave number.

By utilizing the relationships set forth in the equations above, I have found that it is possible to obtain a multilayer filter which has a very wide transmittance band. The transmittance curve for a multilayer filter made in accordance with the present invention is shown in FIGURE 2 in which the transmittance is given as a function of relative wave number which is defined as $\lambda_0/\lambda$ where $\lambda_0$ is the design wavelength and where $\lambda$ is the actual wavelength. From the curve shown in FIGURE 2, it can be seen that the transmission band extends from 1.0 to approximately 5.0 to provide a ratio of wavelengths between the first two adjacent reflectance peaks of 5:1. As can be seen from the curve shown in FIGURE 2, there is a sharp differentiation between the transmission and the reflectance bands.

By way of example, one filter made in accordance with the present invention had the following design $$SA(AB2CBA)10_M$$

in which $$n_S = 1.50$$

$$n_M = 1.00$$

$$n_A = 1.38$$

$$n_B = 1.781$$

$$n_C = 2.30$$

A satisfactory A-type material was found to be magnesium fluoride ($MgF_2$). A satisfactory B material was found to be aluminum oxide ($Al_2O_3$). A satisfactory C-type material was titanium oxide ($TiO_2$).

As pointed out in copending application Ser. No. 110,781, filed May 17, 1961, now United States Letters Patent No. 3,247,392, if necessary or desired, matching coatings can be utilized for matching the multilayer filter to the substrate on which it is mounted and also for matching the multilayer filter to the medium.

As also explained in the above identified copending application, the deposition of layers onto a substrate to form my multilayer filter is well known to those skilled in the art.

From the foregoing, it can be seen that I have provided a filter which has many desirable features and in particular it has a relatively wide reflectance band. In my copending application Ser. No. 110,781, filed May 17, 1961, now United States Letters Patent No. 3,247,392, there is disclosed a heat reflecting filter which is made out of a 4:1 filter and a 3:1 filter. Such a heat reflecting heat filter can also be made utilizing a 3:1, 4:1 and 5:1 or, alternatively, one 3:1 and two 5:1 filters can be utilized to provide such a heat reflecting filter. Thus, because the 5:1 filter herein disclosed has many general applications because of its wider transmission band, it can be utilized in applications where the 4:1 cannot be utilized because it uses different materials to obtain the desired result.

Figure 3:
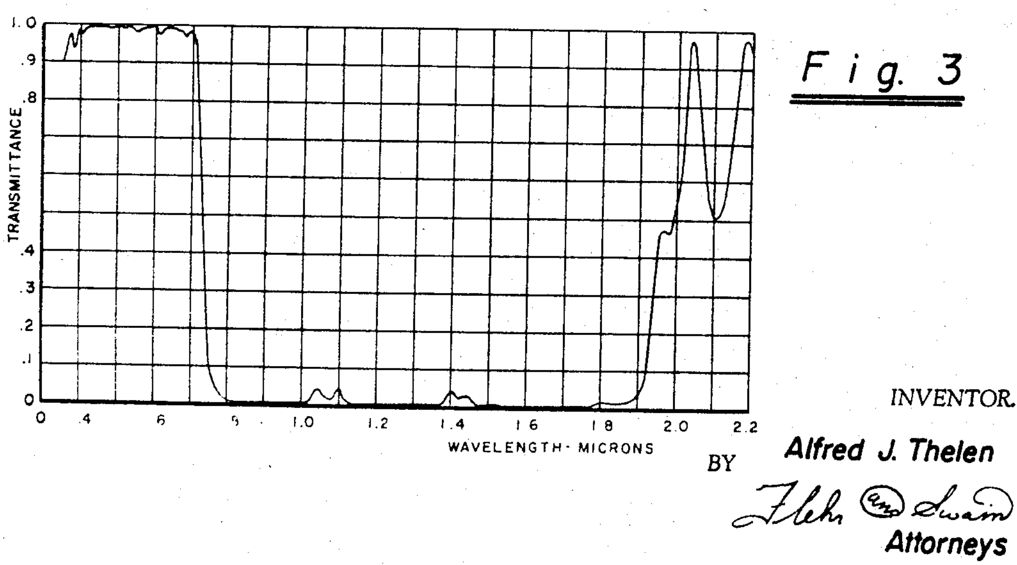
FIGURE 3 shows the transmittance spectrum for a triple stack heat reflector utilizing my multilayer filter with a wide transmittance band.

In FIGURE 3, there is shown the transmittance spectrum for a triple stack heat reflector made from a 3:1 stack, a 4:1 stack and a 5:1 stack combined. The 3:1 stack and the 4:1 stack are disclosed in my copending application Ser. No. 110,781, filed May 17, 1961, now United States Letters Patent No. 3,247,392, whereas the 5:1 stack is disclosed in the present application. As can be seen from FIGURE 3, the bandwidth is from .7 to almost 2.0 microns, while still transmitting all of the visual. If the 5:1 filter was not used for the last stack, a reflectance band would be obtained in the visual and the filter shown in FIGURE 3 would not work as a satisfactory heat reflecting filter.

By way of example, I have found that a triple stack design such as that shown in FIGURE 3 reflects approximately 61.7% of the total infrared energy of a tungsten lamp with a temperature of 2800° K., 62.9% for 3000° K., and 63.3% for 3200° K. Without the utilization of a 5:1 filter, and using a double stack arrangement such as that disclosed in my copending application Ser. No. 110,781, filed May 17, 1961, now United States Letters Patent No. 3,247,392. I have found that it is possible to only reflect 41.0, 44.5 and 45.0% of the total infrared energy for the same temperatures. Thus, it can be seen that there is a very distinct advantage in adding a 5:1 filter to a stack to provide a more satisfactory heat reflector.

It is apparent from the foregoing that I have provided a new and improved multilayer filter which has a wide transmittance band which should have many general applications. It can be utilized for protecting solar cell. There are many other applications as, for example, utilizing the same in connection with a movie projector lens to protect the film from heat. By utilization of the relatively simple formula by which the indices of refraction are interrelated for my multilayer filter, it is possible to readily calculate the desired indices of refraction and to then determine the coating materials to be utilized.

I claim:

1. An optical coating for a design wavelength which is the wavelength of the first reflectance peak counting from the longer wavelength region down of the transmittance band of the coating comprising a plurality of superimposed layers, said layers being formed of three different materials A, B and C, each of the materials having a different index of refraction identified as $n_A$, $n_B$ and $n_C$ respectively having the relationship defined by the equation $$n_B = \sqrt{n_A n_C}$$

the layers being arranged to have a periodicity of AB2CBA and having an optical thickness of substantially one-twelfth of the design wavelength.

2. In a filter having a wide transmittance band, a transparent supporting body, a plurality of superimposed layers superimposed on at least one surface of the supporting body, said layers being formed of three different materials A, B and C with each of the materials having a different index of refraction identified as $n_A$, $n_B$ and $n_C$ respectively and being related by the equation $$n_B = \sqrt{n_A n_C}$$

the layers having a periodicity of A B C C B A, and each having an optical thickness of one-twelfth of the design wavelength in which the design wavelength is the wavelength of the first reflectance peak counting down from the longer wavelength region of the transmittance band of the filter.

3. An optical coating for a predetermined design wavelength comprising a plurality of superimposed layers with a middle layer and with an equal number of layers on opposite sides of the middle layer, said layers being formed of more than two different materials having differend indices of refraction, said layers being arranged in a periodic fashion with the middle layer having an optical thickness which is substantially equal to twice that of the other layers to suppress at least three adjacent low transmittance bands.

4. An optical coating as in claim 3 wherein three different materials A, B and C are utilized, and wherein the three different materials have low, medium and high indices of refraction, and wherein the second, third and fourth order low transmittance bands are suppressed.

5. An optical coating as in claim 4 wherein the layers are arranged to have a periodicity of A B C C B A, and wherein the layers have an optical thickness of substantially one-twelfth the design wavelength.

6. An optical coating as in claim 5 wherein said indices of refraction of said three materials A, B and C are $n_A$, $n_B$ and $n_C$ respectively, and wherein the relationship between the indices of refraction is defined by the equation $$n_B=\sqrt{n_A n_C}$$

References Cited

UNITED STATES PATENTS

| | | | |
|---|---|---|---|
| 2,281,474 | 4/1942 | Cartwright et al. | 350—164 |
| 2,478,385 | 8/1949 | Gaiser | 350—164 |
| 3,151,208 | 9/1964 | Alpert | 350—1 |
| 3,185,020 | 5/1965 | Thelen | 350—164 |
| 3,247,392 | 4/1966 | Thelen | 250—226 |
| 3,279,317 | 10/1966 | Ploke | 350—166 X |

OTHER REFERENCES

Epstein: "Improvements in Heat-Reflecting Filters," J.O.S.A. vol. 45, No. 5, pp. 360–362 (May 1955).

Cox et al.: "Infrared Filters of Antireflected Si, Ge, InAs, and InSb," J.O.S.A., vol. 51, No. 7, pp. 714–718 (July 1961).

Baumeister: "Applications of Thin Film Coatings," Military Handbook 141, Optical Design, Section 20, pp. 58–59 (Oct. 5, 1962).

DAVID SCHONBERG, *Primary Examiner.*

PAUL R. MILLER, *Assistant Examiner.*

U.S. Cl. X.R.

350—1, 164